US012734916B2

(12) United States Patent
Liu et al.

(10) Patent No.: US 12,734,916 B2
(45) Date of Patent: Sep. 15, 2026

(54) CHARGING DEVICE AND VEHICLE

(71) Applicant: BYD COMPANY LIMITED, Shenzhen (CN)

(72) Inventors: Weidong Liu, Shenzhen (CN); Chao Wang, Shenzhen (CN); Xinghui Wang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 761 days.

(21) Appl. No.: 18/299,021

(22) Filed: Apr. 11, 2023

(65) Prior Publication Data

US 2023/0249564 A1 Aug. 10, 2023

Related U.S. Application Data

(63) Continuation of application No. PCT/CN2021/117268, filed on Sep. 8, 2021.

(30) Foreign Application Priority Data

Oct. 13, 2020 (CN) ......................... 202022273527.5

(51) Int. Cl.
*B60L 53/20* (2019.01)
*H02M 1/42* (2007.01)
*H02M 3/335* (2006.01)

(52) U.S. Cl.
CPC ........... *B60L 53/20* (2019.02); *H02M 1/4208* (2013.01); *H02M 3/33569* (2013.01); *B60L 2210/10* (2013.01); *B60L 2210/30* (2013.01)

(58) Field of Classification Search
CPC ............................. B60L 53/20; H02M 1/4208
See application file for complete search history.

(56) References Cited

U.S. PATENT DOCUMENTS

2018/0334044 A1* 11/2018 Jang .......................... H02J 7/02
2019/0061553 A1 2/2019 Yang et al.

FOREIGN PATENT DOCUMENTS

CN 106160491 A 11/2016
CN 109861357 A 6/2019
(Continued)

OTHER PUBLICATIONS

The World Intellectual Property Organization (WIPO) International Search Report for PCT/CN2021/117268 Nov. 26, 2021 5 Pages.
(Continued)

*Primary Examiner* — Robert Grant
(74) *Attorney, Agent, or Firm* — Wenye Tan

(57) ABSTRACT

A charging device includes a PFC circuit, a first DC conversion module, a second DC conversion module, a switch module, and a control module. The PFC circuit includes at least three-phase bridge arm and is configured to perform PFC on an input AC and output a DC signal after the PFC. The first DC conversion module and the second DC conversion module are coupled to the PFC circuit to convert the AC signal. The switch module configured to turn on the three-phase bridge arm of the PFC circuit during three-phase charging or turn on one of the three-phase bridge arm of the PFC circuit during one-way charging. The control module is connected to the PFC circuit, the first and second DC conversion modules, and the switch module to control the charging device to perform single-phase charging or three-phase charging.

18 Claims, 4 Drawing Sheets

(56) References Cited

FOREIGN PATENT DOCUMENTS

| | | | |
|---|---|---|---|
| CN | 110649820 | A | 1/2020 |
| CN | 111492568 | A | 8/2020 |
| CN | 213661257 | U | 7/2021 |
| EP | 3648322 | A1 | 5/2020 |
| JP | 2013150371 | A | 8/2013 |
| JP | 2018148637 | A | 9/2018 |
| JP | 2018201325 | A | 12/2018 |

OTHER PUBLICATIONS

Haoyu Wang. "A phase shift full bridge based reconfigurable PEV onboard charger with extended ZVS range and zero duty cycle loss." 2016 IEEE Applied Power Electronics Conference and Exposition (APEC). IEEE, 2016.

* cited by examiner

CHARGING DEVICE AND VEHICLE

CROSS-REFERENCE TO RELATED APPLICATIONS

The present application is a continuation application of International Patent Application No. PCT/CN2021/117268 filed on Sep. 8, 2021, which is based on and claims priority to the benefit of Chinese Patent Application No. 202022273527.5, filed on Oct. 13, 2020 and entitled "CHARGING DEVICE AND VEHICLE". The entire content of all of the above applications is incorporated herein by reference.

FIELD

The present disclosure relates to the field of vehicle technologies, and more specifically, to a charging device and a vehicle.

BACKGROUND

With the progress of commercialization of electric vehicles, a direct current (DC) converter and an On Board Charger (OBC) of an electric vehicle have become important components of the electric vehicle. During charging of electric vehicles, only single-phase charging or three-phase charging can be performed, and single-phase and three-phase charging cannot be compatible. The charging mode is single, and when a failure occurs during three-phase or single-phase charging, charging can only be temporarily suspended, which is not flexible and convenient enough.

SUMMARY

The present disclosure is intended to resolve at least one of the technical problems existing in the related art. A first objective of the present disclosure is to provide a charging device. The charging device can be compatible with a single-phase function and a three-phase charging function. The charging modes are diverse and the charging is more flexible and convenient.

A second objective of the present disclosure is to provide a vehicle.

In order to achieve the foregoing objectives, the charging device in an embodiment of a first aspect of the present disclosure includes: a power factor correction (PFC) circuit, configured to perform PFC on an input alternating current (AC) and output a direct current (DC) signal after the PFC, where the PFC circuit includes at least three-phase bridge arm; a first DC conversion module, where an input terminal of the first DC conversion module is connected to an output terminal of the PFC circuit; and an output terminal of the first DC conversion module is connected to a power battery and configured to convert the DC signal after the PFC to a first DC signal; a second DC conversion module, where an input terminal of the second DC conversion module is connected to the output terminal of the first DC conversion module; and an output terminal of the second DC conversion module is connected to a storage battery and configured to convert the first DC signal to a second DC signal; a switch module, where a first terminal of the switch module is connected to an input terminal of the PFC circuit; a second terminal of the switch module is connected to an alternating-current input terminal and configured to turn on the three-phase bridge arm of the PFC circuit during three-phase charging or turn on one of the three-phase bridge arm of the PFC circuit during one-way charging; and a control module, respectively connected to control terminals of the PFC circuit, the first DC conversion module, the second DC conversion module, and the switch module and configured to control the charging device to perform single-phase charging or three-phase charging.

According to the charging device in the embodiment of the present disclosure, by adding a switch module, a first terminal of the switch module is connected to an input terminal of the PFC circuit; a second terminal of the switch module is connected to an alternating-current input terminal and configured to turn on the three-phase bridge arm of the PFC circuit during three-phase charging or turn on one of the three-phase bridge arm of the PFC circuit during one-way charging, to realize the single-phase charging or the three-phase charging of the charging vehicle. Therefore, the single-phase charging or the three-phase charging can be compatible. The charging modes are diverse and can be switched to the other charging mode in case of charging failure, causing the charging more flexible and convenient.

In some embodiments of the present disclosure, the second DC conversion module includes: a boost circuit, where an input terminal of the boost circuit is connected to the power battery and configured to boost the first DC signal and output the boosted DC signal; a first half-bridge Inductor-Inductor-Capacitor (LLC) circuit, where an input terminal of the first half-bridge LLC circuit is connected to an output terminal of the boost circuit; and an output terminal of the first half-bridge LLC circuit is connected to the storage battery; and a second half-bridge LLC circuit, where an input terminal of the second half-bridge LLC circuit is connected to the output terminal of the boost circuit; an output terminal of the second half-bridge LLC circuit is connected to the storage battery; a control terminal of the boost circuit, a control terminal of the first half-bridge LLC circuit, and a control terminal of the second half-bridge LLC circuit are all connected to the control module; and the control module is configured to alternately control the first half-bridge LLC circuit and the second half-bridge LLC circuit at a preset phase angle, to convert the boosted DC signal to the second DC signal.

In the embodiment of the present disclosure, the soft switching effect can be realized by adding the boost circuit, to reduce energy consumption and improve the efficiency of the second DC conversion module. An operating voltage range of the second DC conversion module can be increased by boosting the first DC signal through the boost circuit, so that the charging device can adapt to more voltage platforms. Moreover, the first half-bridge LLC circuit and the second half-bridge LLC circuit alternatively turn on, which can effectively improve the efficiency of the half-bridge LLC circuit and reduce the output voltage/current ripple.

In some embodiments of the present disclosure, the boost circuit includes: a first inductor, where a first terminal of the first inductor is connected to a first terminal of the power battery; a first switching transistor, where a first terminal of the first switching transistor is respectively connected to a first input terminal of the first half-bridge LLC circuit and a first input terminal of the second half-bridge LLC circuit; and a control terminal of the first switching transistor is connected to the control module; a second switching transistor, where a first terminal of the second switching transistor is connected to a second terminal of the first switching transistor; a second terminal of the second switching transistor is respectively connected to a second input terminal of the first half-bridge LLC circuit, a second input terminal of the second half-bridge LLC circuit, and a second terminal of the power battery; a control terminal of the second switching transistor is connected to the control module; a first node is arranged between the second terminal of the first switching transistor and the first terminal of the second switching transistor; and the first node is connected to a second terminal of the first inductor; and a first capacitor, where a first terminal of the first capacitor is respectively connected to the first input terminal of the first half-bridge LLC circuit, the first input terminal of the second half-bridge LLC circuit, and the first terminal of the first switching transistor; and a second terminal of the first capacitor is respectively connected to the second input terminal of the first half-bridge LLC circuit, the second input terminal of the second half-bridge LLC circuit, and the second terminal of the second switching transistor. The boost circuit is configured to implement the function of soft switching, which has a high efficiency, and the boost circuit has a wide boost range and more adaptive platforms.

In some embodiments of the present disclosure, the first half-bridge LLC circuit includes: a third switching transistor, where a first terminal of the third switching transistor is the first input terminal of the first half-bridge LLC circuit; the first terminal of the third switching transistor is respectively connected to the first terminal of the first capacitor and the first terminal of the first switching transistor; and a control terminal of the third switching transistor is connected to the control module; a fourth switching transistor, where a first terminal of the fourth switching transistor is connected to a second terminal of the third switching transistor; a second terminal of the fourth switching transistor is the second input terminal of the first half-bridge LLC circuit; the second terminal of the fourth switching transistor is respectively connected to the second terminal of the first capacitor and the second terminal of the second switching transistor; a control terminal of the fourth switching transistor is connected to the control module; and a second node is arranged between the first terminal of the fourth switching transistor and the second terminal of the third switching transistor; a first transformer, including a first primary coil, a first secondary coil, and a second secondary coil, where a first terminal of the first primary coil is connected to the second node through a second inductor and a second capacitor; a second terminal of the first primary coil is connected to the second terminal of the fourth switching transistor; a second terminal of the first secondary coil and a first terminal of the second secondary coil are connected together to form a first common terminal; and the first common terminal is connected to a second terminal of the storage battery; a fifth switching module, where a first terminal of the fifth switching transistor is connected to a first terminal of the storage battery; a second terminal of the fifth switching transistor is connected to the first terminal of the first secondary coil; and a control terminal of the fifth switching transistor is connected to the control module; and a sixth switching transistor, where a first terminal of the sixth switching transistor is respectively connected to the first terminal of the fifth switching transistor and the first terminal of the storage battery; and a second terminal of the sixth switching transistor is connected to a second terminal of the second secondary coil.

In some embodiments of the present disclosure, the second half-bridge LLC circuit includes: a seventh switching transistor, where a first terminal of the seventh switching transistor is the first input terminal of the second half-bridge LLC circuit; the first terminal of the seventh switching transistor is respectively connected to the first terminal of the first capacitor and the first terminal of the first switching transistor; and a control terminal of the seventh switching transistor is connected to the control module; an eighth switching transistor, where a first terminal of the eighth switching transistor is connected to a second terminal of the seventh switching transistor; a second terminal of the eighth switching transistor is the second input terminal of the second half-bridge LLC circuit; the second terminal of the eighth switching transistor is respectively connected to the second terminal of the first capacitor and the second terminal of the second switching transistor; a control terminal of the eighth switching transistor is connected to the control module; and a third node is arranged between the first terminal of the eighth switching transistor and the second terminal of the seventh switching transistor; a second transformer, including a second primary coil, a third secondary coil, and a fourth secondary coil, where a first terminal of the second primary coil is connected to the third node through a third inductor and a third capacitor; a second terminal of the second primary coil is connected to the second terminal of the eighth switching transistor; a second terminal of the third secondary coil and a first terminal of the fourth secondary coil are connected together to form a second common terminal; and the second common terminal is connected to the second terminal of the storage battery; a ninth switching transistor, where a first terminal of the ninth switching transistor is connected to the first terminal of the storage battery; a second terminal of the ninth switching transistor is connected to a first terminal of the third secondary coil; and a control terminal of the ninth switching transistor is connected to the control module; and a tenth switching transistor, where a first terminal of the tenth switching transistor is respectively connected to the first terminal of the ninth switching transistor and the first terminal of the storage battery; a second terminal of the tenth switching transistor is connected to a second terminal of the fourth secondary coil; and a control terminal of the tenth switching transistor is connected to the control module.

In some embodiments of the present disclosure, the switch module includes: a first switch unit, including a first static contact, a first idle contact, and a first switch, where the first static contact is connected to a first-phase alternating-current input terminal; the first idle contact is unoccupied; a first terminal of the first switch is connected to a first-phase bridge arm of the three-phase bridge arm; a second terminal of the first switch is optionally connected to the first static contact or the first idle contact; and the first switch unit is configured to control a connected state of the first-phase bridge arm; a second switch unit, including a second static contact, a third static contact, and a second switch, where the second static contact is connected to a second-phase alternating-current input terminal; the third static contact is connected to the first static contact; a first terminal of the second switch is connected to a second-phase bridge arm of the three-phase bridge arm; a second terminal of the second switch is optionally connected to the second static contact or the third static contact; and the second switch unit is configured to control a connected state of the second-phase bridge arm; a third switch unit, including a fourth static contact, a fifth static contact, and a third switch, where the fourth static contact is connected to a third-phase alternating-current input terminal; the fifth static contact is connected to the first static contact; a first terminal of the third switch is connected to a third-phase bridge arm of the three-phase bridge arm; a second terminal of the third switch is optionally connected to the fourth static contact or the fifth static contact; and the third switch unit is configured to control a connected state of the third-phase bridge arm; and a fourth switch unit, including a sixth static contact, a second idle contact, and a fourth switch, where the sixth static contact is connected to an input terminal of a center line; the second idle contact is unoccupied; a first terminal of the fourth switch is connected to a connecting terminal of a charging circuit of the PFC circuit; a second terminal of the fourth switch is optionally connected to the sixth static contact or the second idle contact; and the fourth switch unit is configured to control a turn-on state of a single-phase charging circuit.

In some embodiments of the present disclosure, the first-phase bridge arm includes an eleventh switching transistor and a twelfth switching transistor; a first terminal of the eleventh switching transistor is connected to a first input terminal of the first DC conversion module; a second terminal of the eleventh switching transistor is connected to a first terminal of the twelfth switching transistor; a control terminal of the eleventh switching transistor is connected to the control module; a second terminal of the twelfth switching transistor is connected to a second input terminal of the first DC conversion module; a fourth node is arranged between the second terminal of the eleventh switching transistor and the first terminal of the twelfth switching transistor; the fourth node is connected to the first terminal of the first switch through a fourth inductor; the second-phase bridge arm includes a thirteenth switching transistor and a fourteenth switching transistor; a first terminal of the thirteenth switching transistor is connected to the first input terminal of the first DC conversion module; a second terminal of the thirteenth switching transistor is connected to a first terminal of the fourteenth switching transistor; a control terminal of the thirteenth switching transistor is connected to the control module; a second terminal of the fourteenth switching transistor is connected to the second input terminal of the first DC conversion module; a control terminal of the fourteenth switching transistor is connected to the control module; a fifth node is arranged between the first terminal of the fourteenth switching transistor and the second terminal of the thirteenth switching transistor; the fifth node is connected to the first terminal of the second switch through a fifth inductor; the third-phase bridge arm includes a fifteenth switching transistor and a sixteenth switching transistor; a first terminal of the fifteenth switching transistor is connected to the first input terminal of the first DC conversion module; a second terminal of the fifteenth switching transistor is connected to a first terminal of the sixteenth switching transistor; a control terminal of the fifteenth switching transistor is connected to the control module; a second terminal of the sixteenth switching transistor is connected to the second input terminal of the first DC conversion module; a control terminal of the sixteenth switching transistor is connected to the control module; a sixth node is arranged between the first terminal of the sixteenth switching transistor and the second terminal of the fifteenth switching transistor; and the sixth node is connected to the first terminal of the third switch through a sixth inductor; the PFC circuit further includes a fifth capacitor and a sixth capacitor; a first terminal of the fifth capacitor is respectively connected to the first terminal of the eleventh switching transistor, the first terminal of the thirteenth switching transistor, and the first terminal of the fifteenth switching transistor; a second terminal of the fifth capacitor is connected to a first terminal of the sixth capacitor; a second terminal of the sixth capacitor is respectively connected to the second terminal of the twelfth switching transistor, the second terminal of the fourteenth switching transistor, and the second terminal of the sixteenth switching transistor; a seventh node is arranged between the second terminal of the fifth capacitor and the first terminal of the sixth capacitor; the seventh node is connected to the first terminal of the fourth switch; the PFC circuit further includes a first resistor; a first terminal of the first resistor is connected to the first terminal of the fifth capacitor; and a second terminal of the first resistor is connected to the second terminal of the sixth capacitor.

In some embodiments of the present disclosure, the first DC conversion module includes: a seventeenth switching transistor, an eighteenth switching transistor, a nineteenth switching transistor, and a twentieth switching transistor; a first terminal of the seventeenth switching transistor and a first terminal of the nineteenth switching transistor are connected together to form the first input terminal of the first DC conversion module; a second terminal of the eighteenth switching transistor and a second terminal of the twentieth switching transistor are connected together to form the second input terminal of the first DC conversion module; the first terminal of the seventeenth switching transistor is respectively connected to the first terminal of the fifth capacitor and the first terminal of the fifteenth switching transistor; the second terminal of the seventeenth switching transistor is connected to the first terminal of the eighteenth switching transistor; a control terminal of the seventeenth switching transistor is connected to the control module; the second terminal of the eighteenth switching transistor is respectively connected to the second terminal of the sixth capacitor and the second terminal of the sixteenth switching transistor; a control terminal of the eighteenth switching transistor is connected to the control module; an eighth node is arranged between the first terminal of the eighteenth switching transistor and the second terminal of the seventeenth switching transistor; the first terminal of the nineteenth switching transistor is connected to the first terminal of the seventeenth switching transistor; the second terminal of the nineteenth switching transistor is connected to a first terminal of the twentieth switching transistor; a control terminal of the nineteenth switching transistor is connected to the control module; the second terminal of the twentieth switching transistor is connected to the second terminal of the eighteenth switching transistor; a control terminal of the twentieth switching transistor is connected to the control module; and a ninth node is arranged between the first terminal of the twentieth switching transistor and the second terminal of the nineteenth switching transistor; a third transformer, including a third primary coil and a fifth secondary coil, where a first terminal of the third primary coil is connected to the eighth node through a seventh inductor; and a second terminal of the third primary coil is connected to the ninth node through a seventh capacitor; a twenty-first switching transistor and a twenty-second switching transistor, where a first terminal of the twenty-first switching transistor is connected to a first terminal of the power battery; a second terminal of the twenty-first switching transistor is connected to a first terminal of the twenty-second switching transistor; a control terminal of the twenty-first switching transistor is connected to the control module; a second terminal of the twenty-second switching transistor is connected to a second terminal of the power battery; a control terminal of the twenty-second switching transistor is connected to the control module; a tenth node is arranged between the first terminal of the twenty-second switching transistor and the second terminal of the twenty-first switching transistor; and the tenth node is connected to a first terminal of the fifth secondary coil through an eighth inductor; a twenty-third switching transistor and a twenty-fourth switching transistor, where a first terminal of the twenty-third switching transistor is connected to the first terminal of the power battery; a second terminal of the twenty-third switching transistor is connected to a first terminal of the twenty-fourth switching transistor; a control terminal of the twenty-third switching transistor is connected to the control module; a second terminal of the twenty-fourth switching transistor is connected to the second terminal of the power battery; a control terminal of the twenty-fourth switching transistor is connected to the control module; an eleventh node is arranged between the first terminal of the twenty-fourth switching transistor and the second terminal of the twenty-third switching transistor; and the eleventh node is connected to a second terminal of the fifth secondary coil through an eighth capacitor; and a ninth capacitor, where a first terminal of the ninth capacitor is respectively connected to the first terminal of the twenty-third switching transistor and the first terminal of the power battery; and a second terminal of the ninth capacitor is respectively connected to the second terminal of the twenty-fourth switching transistor and the second terminal of the power battery.

In some embodiments of the present disclosure, the charging device further includes: a filtering module, where an input terminal of the filtering module is connected to the alternating-current input terminal; and an output terminal of the filtering module is connected to the second terminal of the switch module to filter the input AC signal.

In order to achieve the foregoing objectives, the vehicle in an embodiment of a second aspect of the present disclosure includes: a power battery, a storage battery, and the charging device, where the charging device is respectively connected to the power battery and the storage battery to charge the power battery and the storage battery.

DETAILED DESCRIPTION

The foregoing and/or additional aspects and advantages of the present disclosure will become more apparent and comprehensible from the following descriptions of the embodiments with reference to the accompanying drawings. The embodiments of the present invention are described in detail below, and the embodiments described with reference to accompanying drawings are exemplary.

Figure 1:
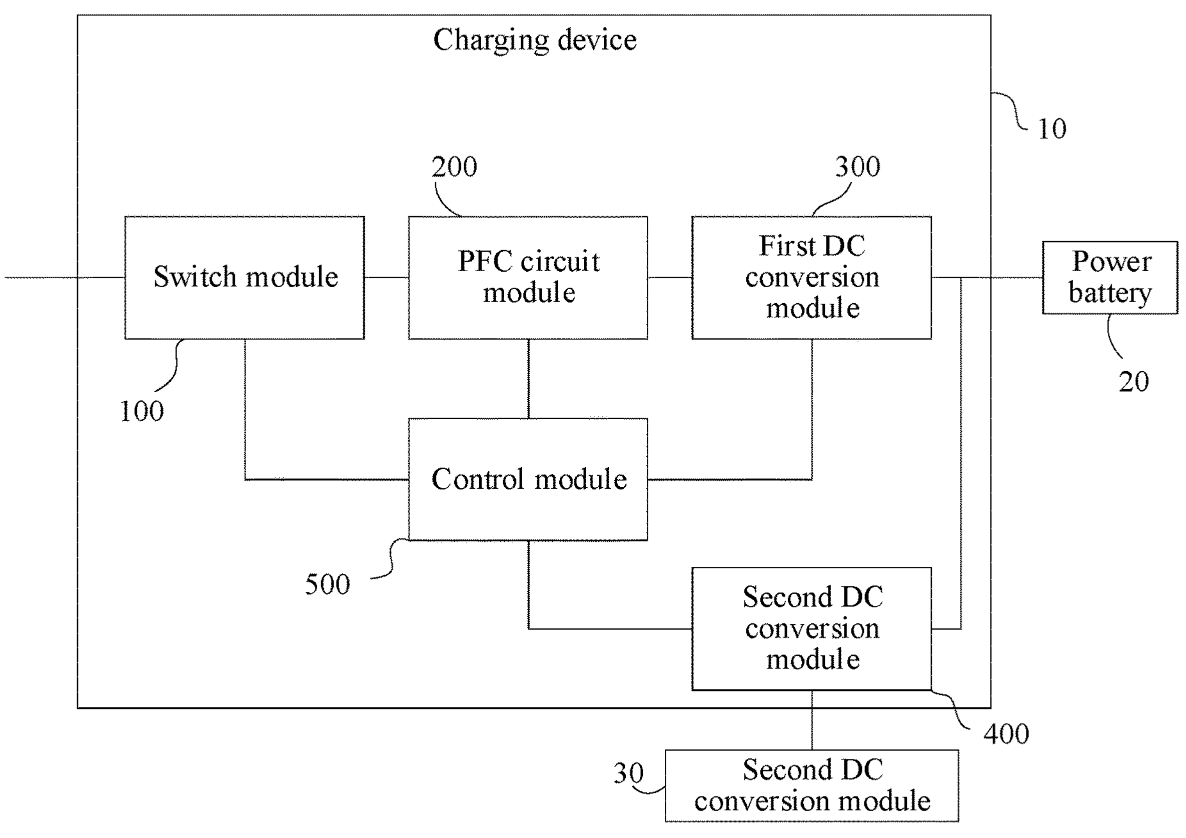
FIG. 1 is a block diagram of a charging device according to an embodiment of the present disclosure.

FIG. 1 is a block diagram of a charging device according to an embodiment of the present disclosure.

In the embodiment of the present disclosure, as shown in FIG. 1, the charging device 10 includes a switch module 100, a power factor correction (PFC) circuit 200, a first direct current (DC) conversion module 300, a second DC conversion module 400, and a control module 500.

The PFC circuit 200 is configured to perform PFC on an input alternating current (AC) and output a DC signal after the PFC, so as to realize the conversion from AC power to DC power and reduce energy consumption. The PFC circuit 200 includes at least three-phase bridge arm.

An input terminal of the first DC conversion module 300 is connected to an output terminal of the PFC circuit 200. An output terminal of the first DC conversion module 300 is connected to a power battery 20. The first DC conversion module 300 is configured to convert the DC signal after the PFC into a first DC signal, such as a DC signal required for the power battery 20, so as to supply power to the power battery 20.

An input terminal of the second DC conversion module 400 is connected to the output terminal of the first DC conversion module 300 and the power battery. An output terminal of the second DC conversion module 400 is connected to a storage battery 30. The second DC conversion module 400 is configured to convert the first DC signal into a second DC signal, such as a DC signal required for the storage battery 30. For example, the DC signal processed by the first DC conversion module 300 or the DC signal outputted from the power battery 20 is converted to the DC signal required for the storage battery 30 to charge the storage battery.

A first terminal of the switch module 100 is connected to an input terminal of the PFC circuit 200. A second terminal of the switch module 100 is connected to an alternating-current input terminal and configured to turn on the three-phase bridge arm of the PFC circuit 200 during three-phase charging; or turn on one-phase bridge arm of the three-phase bridge arm of the PFC circuit 200 during one-way charging. A single-phase and three-phase compatible charging function can be realized by adding the switch module 100.

The control module 500 is respectively connected to control terminals of the PFC circuit 200, the first DC conversion module 300, the second DC conversion module 400, and the switch module 100 and configured to control the charging device 10 to perform single-phase charging or three-phase charging.

Specifically, the control module 500 controls on and off of the switching transistors in the PFC circuit 200, the first DC conversion module 300, and the second DC conversion module 400. For example, when a power grid is the three-phase power, the control module controls the switch module 100 to connect the three-phase bridge arm of the PFC circuit, and controls the PFC circuit 200, the first DC conversion module 300, and the second DC conversion module 400 based on a three-phase charging principle, so as to realize the three-phase charging of the power battery and the storage battery. Alternatively, when the power grid is the single-phase power, the control module controls the switch module 100 to connect the one of the three-phase bridge arm of the PFC circuit and form a charging circuit, and controls the PFC circuit 200, the first DC conversion module 300, and the second DC conversion module 400 to realize the single-phase charging of the power battery and the storage battery.

The charging device 10 in the embodiment of the present disclosure, by adding the switch module, a first terminal of the switch module is connected to an input terminal of the PFC circuit and a second terminal of the switch module is connected to an alternating-current input terminal, so that the charging device 10 can perform the three-phase charging and the single-phase charging to achieve the compatibility with the single-phase charging and the three-phase charging, and the charging mode is more diverse. When the three-phase charging fails, the single-phase charging can also be switched. The charging is more flexible and convenient.

Figure 2:
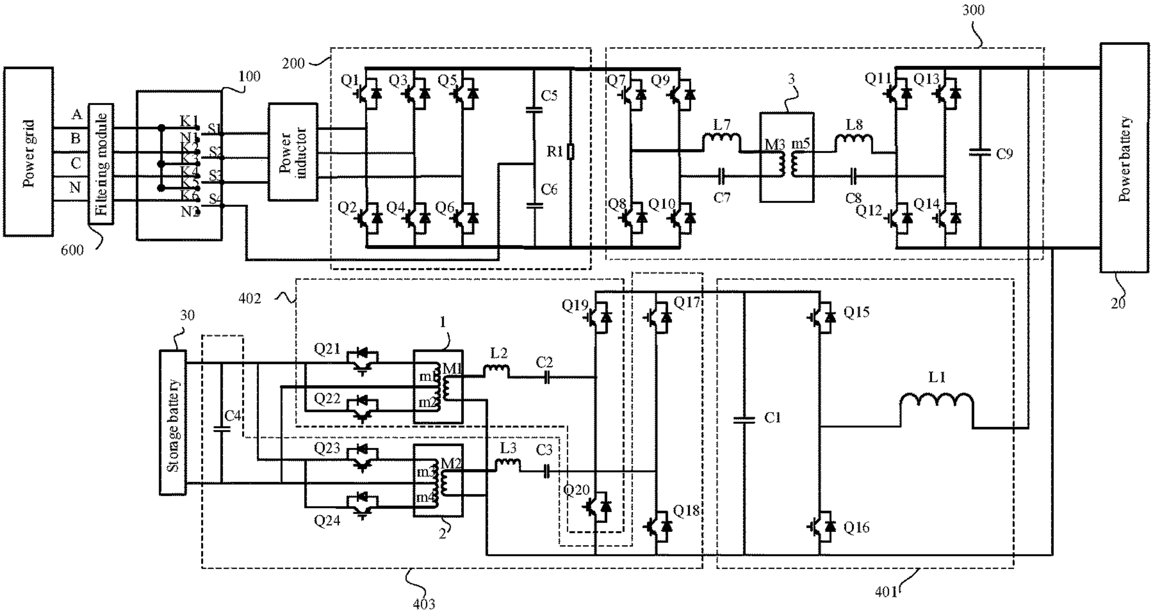
FIG. 2 is a circuit topology diagram of a charging device according to an embodiment of the present disclosure.

FIG. 2 is a circuit topology diagram of a charging device according to an embodiment of the present disclosure.

In the embodiment of the present disclosure, as shown in FIG. 2, the second DC conversion module 400 includes a boost circuit 401, a first half-bridge Inductor-Inductor-Capacitor (LLC) circuit 402, and a second half-bridge LLC circuit 403.

In this embodiment, as shown in FIG. 2, an input terminal of the boost circuit 401 is connected to power battery 20. By arranging the boost circuit 401, the DC signal outputted from the power battery 20 can be boosted, a voltage range of the DC signal can be broadened to adapt to more high-voltage operating platforms or low-voltage operating platforms, and the boosted DC signal is outputted. An input terminal of the first half-bridge LLC circuit 402 is connected to an output terminal of the boost circuit 401, and an output terminal of the first half-bridge LLC circuit 402 is connected to the storage battery 30 and configured to step down the DC signal after the boost processing to supply power to the storage battery 30. An input terminal of the second half-bridge LLC circuit 403 is connected to the output terminal of the boost circuit 401, and an output terminal of the second half-bridge LLC circuit 403 is connected to the storage battery 30 and configured to step down the DC signal after the boost processing to power the storage battery 30.

As shown in FIG. 2, a control terminal of the boost circuit 401, a control terminal of the first half-bridge LLC circuit 402, and a control terminal of the second half-bridge LLC circuit 403 are connected to the control module 500. The control module 500 controls the switching transistors in the boost circuit 401 to turn on and off to boost the DC signal outputted by the power battery 20. Moreover, the second half-bridge LLC circuit 403 is arranged in parallel with the first half-bridge LLC circuit 402. The control module 500 is configured to alternatively control the first half-bridge LLC circuit 402 and the second half-bridge LLC circuit 403 at a preset phase angle, such as 90 degrees. That is to say, the first half-bridge LLC circuit 402 and the second half-bridge LLC circuit 403 are controlled to be periodically turned on alternately to convert the boosted DC signal into the DC signal required for the storage battery 30, which can reduce the system loss, improve the efficiency, and reduce the output voltage/current ripple.

In the embodiment of the present disclosure, as shown in FIG. 2, the boost circuit 401 includes a first inductor L1, a first switching transistor Q15, a second switching transistor Q16, and a first capacitor C1.

As shown in FIG. 2, a first terminal of the first inductor L1 is connected to a first terminal of the power battery 20 and configured to input the DC signal of the power battery 20. A first terminal of the first switching transistor Q15 is respectively connected to a first input terminal of the first half-bridge LLC circuit 403 and a first input terminal of the second half-bridge LLC circuit 403. A control terminal of the first switching transistor Q15 is connected to the control module 500. A first terminal of the second switching transistor Q16 is connected to a second terminal of the first switching transistor Q15. A second terminal of the second switching transistor Q16 is respectively connected to a second input terminal of the first half-bridge LLC circuit 402, a second input terminal of the second half-bridge LLC circuit 403, and a second terminal of the power battery 20. The control terminal of the second switching transistor Q16 is connected to the control module 500. A first node is arranged between the second terminal of the first switching transistor Q15 and the first terminal of the second switching transistor Q16. The first node is connected to a second terminal of the first inductor L1. A first terminal of the first capacitor C1 is respectively connected to the first input terminal of the first half-bridge LLC circuit 402, the first input terminal of the second half-bridge LLC circuit 403, and the first terminal of the first switching transistor Q15. The second terminal of the first capacitor C1 is respectively connected to the second input terminal of the first half-bridge LLC circuit 402, the second input terminal of the second half-bridge LLC circuit 403, and the second terminal of the second switching transistor Q16. The control module 500 controls the first switching transistor Q15 and the second switching transistor Q16 in the boost circuit 401 to turn on and off to boost the DC signal outputted by the power battery 20.

Figure 3:
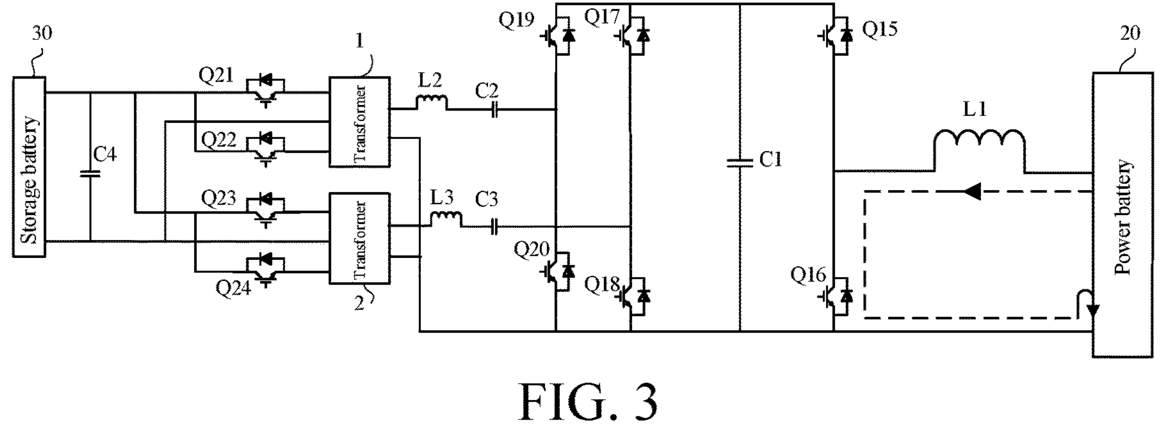
FIG. 3 is a schematic diagram of turn-on of a boost circuit according to an embodiment of the present disclosure.

FIG. 3 is a schematic diagram of turn-on of a boost circuit according to an embodiment of the present disclosure.

In the embodiment of the present disclosure, the control module 500 can first control the boost circuit 401 and regulate the first capacitor C1 to a preset target voltage value, such as VboostRdf, in the charging process of the storage battery 30. In practice, this VboostRdf can be set according to the voltage of the storage battery 30, where the boost circuit 401 can use the boost circuit.

Specifically, as shown in FIG. 3, in the charging process of the storage battery 30, the control module 500 firstly controls the first switching transistor Q15 to turn off and the second switching transistor Q16 to turn on, and the DC signal in the power battery 20 returns to the second terminal of the power battery 20 through the first inductor L1 and the second switching transistor Q16. In this case, the first inductor L1 stores energy.

Figure 4:
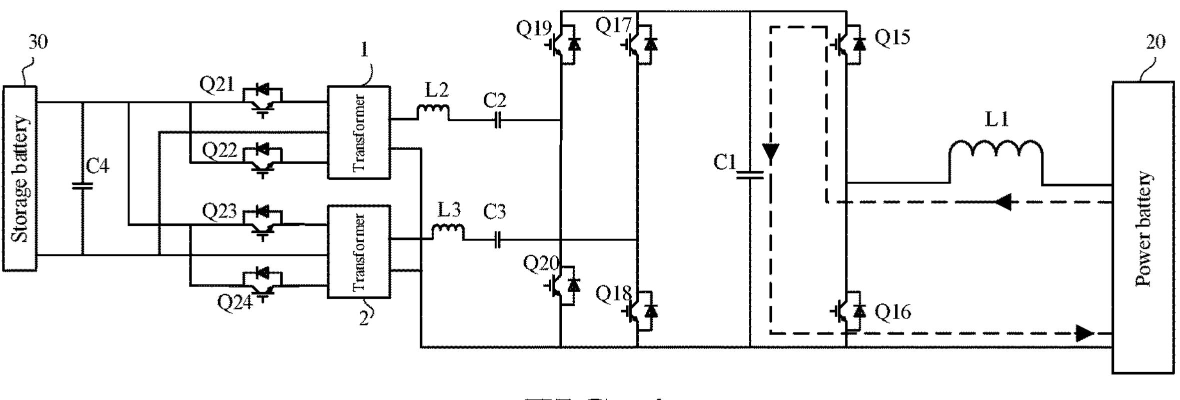
FIG. 4 is a schematic diagram of turn-on of a boost circuit according to another embodiment of the present disclosure.

FIG. 4 is a schematic diagram of turn-on of a boost circuit according to another embodiment of the present disclosure.

In the embodiment of the present disclosure, as shown in FIG. 4, after a first inductor L1 stores energy, a control module 500 controls a first switching transistor Q15 to be turned on and the second switching transistor Q16 to be turned off. In this case, the energy in the first inductor L1 is used for charging a first capacitor C1 through the first switching transistor Q15. Through the above process, the function of boosting the first capacitor C1 can also be realized by adjusting an effective duty cycle of turn-on of Q16, so as to increase a voltage of the first capacitor C1 to VboostRdf and complete the boost processing of the DC signal outputted by the power battery 20. A boost circuit 401 of the present disclosure uses the boost circuit to implement the function of soft switching and high efficiency, and the boost circuit has a wide boost range and more adaptive platforms.

In the embodiment of the present disclosure, as shown in FIG. 2, the first half-bridge LLC circuit 402 includes a third switching transistor Q19, a fourth switching transistor Q20, a first transformer 1, a fifth switching transistor Q21, and a sixth switching transistor Q22.

As shown in FIG. 2, a first terminal of the third switching transistor Q19 is the first input terminal of the first half-bridge LLC circuit 402, the first terminal of the third switching transistor Q19 is respectively connected to the first terminal of the first capacitor C1 and the first terminal of the first switching transistor Q15, and a control terminal of the third switching transistor Q19 is connected to the control module 500. A first terminal of the fourth switching transistor Q20 is connected to a second terminal of the third switching transistor Q19. A second terminal of the fourth switching transistor Q20 is the second input terminal of the first half-bridge LLC circuit 402. The second terminal of the fourth switching transistor Q20 is respectively connected to the second terminal of the first capacitor C1 and the second terminal of the second switching transistor Q16. A control terminal of the fourth switching transistor Q20 is connected to the control module 500. A second node is arranged between the first terminal of the fourth switching transistor Q20 and the second terminal of the third switching transistor Q19. The first transformer 1 includes a first primary coil M1, a first secondary coil m1, and a second secondary coil m2 for transforming the boosted DC signal. For example, a high-voltage DC signal outputted by the boost circuit 401 is converted to a low-voltage DC signal required for the storage battery 30 to power the storage battery 30. A first terminal of the first primary coil M1 is connected to the second node through the second inductor L2 and the second capacitor C2. A second terminal of the first primary coil M1 is connected to a second terminal of the fourth switching transistor Q20. The second terminal of the first secondary coil m1 and the first terminal of the second secondary coil m2 are connected together to form a first common terminal. The first common terminal is connected to a first terminal of the storage battery 30. A second terminal of the fifth switching transistor Q21 is connected to the first terminal of the first secondary coil m1. A control terminal of the fifth switching transistor Q21 is connected to the control module 500. A first terminal of the sixth switching transistor Q22 is respectively connected to the first terminal of the fifth switching transistor Q21 and the first terminal of the storage battery 30. A second terminal of the sixth switching transistor Q22 is connected to a second terminal of the second secondary coil m2. The control module 500 can supply power to the storage battery 30 by controlling the third switching transistor Q19, the fourth switching transistor Q20, the fifth switching transistor Q21, and the sixth switching transistor Q22.

In the embodiment of the present disclosure, the second half-bridge LLC circuit 403 includes a seventh switching transistor Q17, an eighth switching transistor Q18, a second transformer 2, a ninth switching transistor Q23, and a tenth switching transistor Q24. The second DC conversion module 400 further includes a fourth capacitor C4.

As shown in FIG. 2, a first terminal of the seventh switching transistor Q17 is a first input terminal of the second half-bridge LLC circuit 403, the first terminal of the seventh switching transistor Q17 is respectively connected to the first terminal of the first capacitor C1 and the first terminal of the first switching transistor Q15, and a control terminal of the seventh switching transistor Q17 is connected to the control module 500. A first terminal of the eighth switching transistor Q18 is connected to the second terminal of the seventh switching transistor Q17. A second terminal of the eighth switching transistor Q18 is the second input terminal of the second half-bridge LLC circuit 403. The second terminal of the eighth switching transistor Q18 is respectively connected to the second terminal of the first capacitor C1 and the second terminal of the second switching transistor Q16. A control terminal of the eighth switching transistor Q18 is connected to the control module 500. A third node is arranged between the first terminal of the eighth switching transistor Q18 and the second terminal of the seventh switching transistor Q17. The second transformer 2 includes a second primary coil M2, a third secondary coil m3, and a fourth secondary coil m4 for transforming the boosted DC signal. For example, a high-voltage DC signal outputted by the boost circuit 401 is converted to a low-voltage DC signal required for the storage battery 30 to power the storage battery 30. A first terminal of the second primary coil M2 is connected to the third node through a third inductor L3 and a third capacitor C3. A second terminal of the second primary coil M2 is connected to a second terminal of the eighth switching transistor Q18. A second terminal of the third secondary coil m3 and a first terminal of the fourth secondary coil m4 are connected together to form a second common terminal. The second common terminal is connected to a second terminal of a storage battery 40. A first terminal of the ninth switching transistor Q23 is connected to the first terminal of the storage battery 30. A second terminal of the ninth switching transistor Q23 is connected to the first terminal of the third secondary coil m3. A control terminal of the ninth switching transistor Q23 is connected to the control module 500. A first terminal of the tenth switching transistor Q24 is respectively connected to the first terminal of the ninth switching transistor Q23 and the first terminal of the storage battery 30. A second terminal of the tenth switching transistor Q24 is connected to the second terminal of the fourth secondary coil m4, and a control terminal of the tenth switching transistor Q24 is connected to the control module 500. A first terminal of the fourth capacitor C4 is connected to the first terminal of the storage battery, and a second terminal of the fourth capacitor C4 is connected to the second terminal of the storage battery.

In the embodiment of the present disclosure, in the charging of the storage battery 30, when the first capacitor C1 is regulated to VboostRdf, the control module 500 can control the half-bridge LLC circuit to start and control the first half-bridge LLC circuit 402 and the second half-bridge LLC circuit 403 to alternatively switch, so as to supply power to the storage battery 30 alternately.

Specifically, for example, in practice, a resonant frequency of the charging circuit is known and denoted Fr. The alternate switching frequency of the control module 500 controlling the first half-bridge LLC circuit 402 and the second half-bridge LLC circuit 403 is denoted as Fs. The control module 500 controls an open-loop output of the first half-bridge LLC circuit 402 and the second half-bridge LLC circuit 403. When the alternate switching frequency of the half-bridge LLC circuit is equal to the resonant frequency of the charging circuit, that is, Fs=Fr, the system loss is minimum and the efficiency of the two half-bridge LLC circuits is the highest. More specifically, for example, the control module 500 can control two parallel half-bridge LLC circuits with an alternating switch of 90 degrees. That is to say, after the first half-bridge LLC circuit 402 starts operating at 90 degrees, the second half-bridge LLC circuit 403 starts operating, and the first half-bridge LLC circuit 402 starts operating again at 90 degrees, to supply power to the storage battery 30. Such setting can widen a gain range of the half-bridge LLC circuit to achieve a 1:1 gain output and a monotonic voltage gain.

Figure 5:
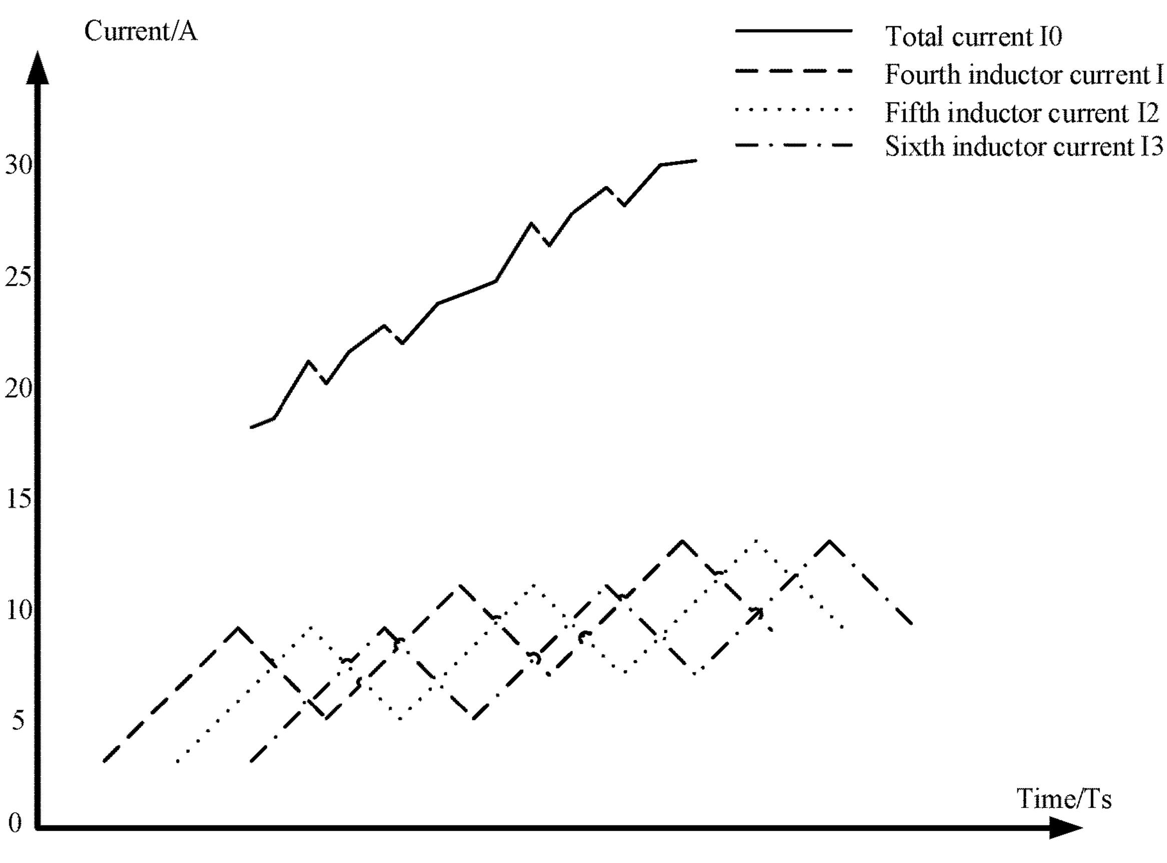
FIG. 5 is a waveform diagram of currents versus times according to an embodiment of the present disclosure.

FIG. 5 is a waveform diagram of currents versus times according to an embodiment of the present disclosure.

In the embodiment of the present disclosure, in a three-phase power supply process, a control module 500 controls a first half-bridge LLC circuit 402 and a second half-bridge LLC circuit 403 to be periodically turned on alternatively, which can also effectively reduce an output voltage/current ripple. As shown in FIG. 3, compared with a total output current I0, three-phase output currents of a fourth inductor current I1, a fifth inductor current I2, and a sixth inductor current I3 effectively reduce the output voltage/current ripple.

In the embodiment of the present disclosure, during charging of a storage battery 30, a low-voltage DC signal in the two half-bridge LLC circuits is outputted at 1:1. The low-voltage DC signal is the low-voltage DC signal required for the storage battery 30. For example, a voltage threshold such as VlowRef may be set according to the low-voltage DC signal required during charging of the storage battery 30. However, in practical application, a case that the output low voltage is greater than or less than VlowRef may also occur. Therefore, the control module 500 can collect a voltage value of the low-voltage DC signal at an output terminal of a second DC conversion module 400 in real time. When the voltage value of the low-voltage DC signal at the output terminal is less than VlowRef, the control module 500 can transmit a control signal to raise VboostRdf of a first capacitor C1 until the voltage value of the collected low-voltage DC signal at the output terminal is equal to VlowRef. If the voltage value of the collected low-voltage DC signal at the output terminal is greater than VlowRef, the control module 500 can transmit a control signal to reduce VboostRdf of the first capacitor C1 until the voltage value of the collected low-voltage DC signal at the output terminal is equal to VlowRef. The whole system can always dynamically circulate to ensure that the voltage of the low-voltage DC signal at the output terminal of the second DC conversion module 400 is always equal to the voltage value of the low-voltage DC signal required when the storage battery 30 is charged, so as to stably output the voltage.

In the embodiment of the present disclosure, as shown in FIG. 2, the switch module 100 includes a first switch unit 101, a second switch unit 102, a third switch unit 103, and a fourth switch unit 104.

As shown in FIG. 2, the first switch unit 101 includes a first static contact K1, a first idle contact N1, and a first switch S1. The first static contact K1 is connected to a first-phase alternating-current input terminal. The first idle contact N1 is unoccupied. A first terminal of the first switch S1 is connected to a first-phase bridge arm 201 of the three-phase bridge arm. A second terminal of the first switch S1 is optionally connected to the first static contact K1 or the first idle contact N1. The first switch unit 101 is configured to control a connected state of the first-phase bridge arm 201. For example, if the first switch S1 is connected to the first static contact K1, a phase A circuit has current. That is to say, the first-phase bridge arm 201 can be connected to the AC power supply through the phase A circuit. The first switch S1 is connected to the first idle contact N1, the phase A circuit has no current, and the first-phase bridge arm 201 cannot communicate with the AC power supply.

The second switch unit 102 includes a second static contact K2, a third idle contact K3, and a second switch S2. The second static contact K2 is connected to a second-phase alternating-current input terminal. The third static contact K3 is connected to the first static contact K1. A first terminal of the second switch S2 is connected to a second-phase bridge arm 202 of the three-phase bridge arm. A second terminal of the second switch S2 is optionally connected to the second static contact K2 or the third static contact K3. The second switch unit 102 is configured to control a connected state of the second-phase bridge arm 202. For example, if the second switch S2 is connected to the second static contact K2, a phase B circuit has current. That is to say, the second-phase bridge arm 202 can communicate with the AC power supply through the phase B circuit. If the second switch S2 is connected to the third static contact K3, the phase A circuit has current. That is to say, the second-phase bridge arm 202 can be connected to the AC power supply through the phase A circuit.

The third switch unit 103 includes a fourth static contact K4, a fifth static contact K5, and a third switch S3. The fourth static contact K4 is connected to a third-phase alternating-current input terminal. The fifth static contact K5 is connected to the first static contact K1. A first terminal of the third switch S3 is connected to a third-phase bridge arm 203 of the three-phase bridge arm. A second terminal of the third switch S3 is optionally connected to the fourth static contact K4 or the fifth static contact K5. The third switch unit 103 is configured to control a connected state of the third-phase bridge arm 203. For example, if the third switch S3 is connected to the fourth static contact K4, a phase C circuit has current. That is to say, the third-phase bridge arm 203 can be connected to the AC power supply through the phase C circuit. If the third switch S3 is connected to the fifth static contact K5, the phase A circuit has no current. That is to say, the third-phase bridge arm 203 can communicate with the AC power supply through the phase A circuit.

The fourth switch unit 104 includes a sixth static contact K6, a second idle contact N2, and a fourth switch S4. The sixth static contact K6 is connected to an input terminal of a center line. The second idle contact N2 is unoccupied. A first terminal of the fourth switch S4 is connected to a connecting terminal of a charging circuit of the PFC circuit. A second terminal of the fourth switch S4 is optionally connected to the sixth static contact K6 or the second idle contact N2. The fourth switch unit 104 is configured to control a connected state of a single-phase charging circuit. For example, when the single-phase charging is performed, the fourth switch S4 is connected to the sixth static contact K6 and the output AC current can form a closed circuit with an N-phase circuit through the PFC circuit 200. If the fourth switch S4 is connected to the second idle contact N2, the closed circuit cannot be formed. That is, the single-phase charging cannot be performed.

In the embodiment of the present disclosure, as shown in FIG. 2, compared with the related art where only single-phase charging or only three-phase charging can be performed, the single-phase compatible charging function and the three-phase compatible charging function can be realized by adding the switch module 100 and the control module 500 controls the connection between the four switches and the corresponding contacts.

Specifically, as shown in FIG. 2, when the AC power supply performs three-phase charging, the control module 500 respectively controls the first switch S1 to be connected with the first static contact K1, the second switch S2 to be connected with the second static contact K2, and the third switch S3 to be connected with the fourth static contact K4, so that a current passes through each of the phase A circuit, the phase B circuit, and the phase C circuit, thereby realizing the three-phase charging function. When the AC power supply performs single-phase charging, the control module 500 respectively controls the first switch S1 to be connected to the first static contact K1, the second switch S2 to be connected to the third static contact K3, and the third switch S3 to be connected to the fifth static contact K5, so that the three-phase bridge arm are all in communication with the AC power supply through the phase A circuit. A current passes through only the phase A circuit, and no current passes through the phase B circuit and the phase C circuit. The control module 500 can further control the fourth switch S4 and the sixth static contact K6, respectively, so that the AC current passes through the first-phase bridge arm 201 and a closed circuit is formed by the fifth capacitor C5 and the sixth capacitor C6 through the N-phase circuit, and conversion of the AC electrical signal to the DC signal is performed, thereby realizing the single-phase charging function.

In the embodiment of the present disclosure, as shown in FIG. 2, the first-phase bridge arm 201 includes an eleventh switching transistor Q1 and a twelfth switching transistor Q2. A first terminal of the eleventh switching transistor Q1 is connected to a first input terminal of the first DC conversion module 300. A second terminal of the eleventh switching transistor Q1 is connected to a first terminal of the twelfth switching transistor Q2. A control terminal of the eleventh switching transistor Q1 is connected to the control module 500. A second terminal of the twelfth switching transistor Q2 is connected to a second input terminal of the first DC conversion module 300. A fourth node is arranged between the second terminal of the eleventh switching transistor Q1 and the first terminal of the twelfth switching transistor Q2. The fourth node is connected to the first terminal of the first switch S1 through a fourth inductor. During the AC single-phase charging or three-phase charging, the control module 500 controls the first switch unit 101 to be turned on and controls the eleventh switching transistor Q1 and the twelfth switching transistor Q2 to be turned on, so as to realize the single-phase charging or the three-phase charging.

The second-phase bridge arm 202 includes a thirteenth switching transistor Q3 and a fourteenth switching transistor Q4. A first terminal of the thirteenth switching transistor Q3 is connected to the first input terminal of the first DC conversion module 300. A second terminal of the thirteenth switching transistor Q3 is connected to a first terminal of the fourteenth switching transistor Q4. A control terminal of the thirteenth switching transistor Q3 is connected to the control module 500. A second terminal of the fourteenth switching transistor Q4 is connected to the second input terminal of the first DC conversion module 300. A control terminal of the fourteenth switching transistor Q4 is connected to the control module 500. A fifth node is arranged between the first terminal of the fourteenth switching transistor Q4 and the second terminal of the thirteenth switching transistor Q3. The fifth node is connected to the first terminal of the second switch S2 through a fifth inductor. In the charging process, the control module 500 controls the thirteenth switching transistor Q3 and the fourteenth switching transistor Q4 to turn on for the three-phase charging, or the thirteenth switching transistor Q3 and the fourteenth switching transistor Q4 to turn off for the single-phase charging or to terminal the charging.

The third-phase bridge arm 203 includes a fifteenth switching transistor Q5 and a sixteenth switching transistor Q6. A first terminal of the fifteenth switching transistor Q5 is connected to the first input terminal of the first DC conversion module 300. A second terminal of the fifteenth switching transistor Q5 is connected to a first terminal of the sixteenth switching transistor Q6. A control terminal of the fifteenth switching transistor Q5 is connected to the control module 500. A second terminal of the sixteenth switching transistor Q6 is connected to the second input terminal of the first DC conversion module 300. A control terminal of the sixteenth switching transistor Q6 is connected to the control module 500. A sixth node is arranged between the first terminal of the sixteenth switching transistor Q6 and the second terminal of the fifteenth switching transistor Q5. The sixth node is connected to the first terminal of the third switch S3 through a sixth inductor. In the charging process, the control module 500 controls the fifteenth switching transistor Q5 and the sixteenth switching transistor Q6 to turn on for the three-phase charging, or the fifteenth switching transistor Q5 and the sixteenth switching transistor Q6 to turn off for the single-phase charging or to end the charging.

The PFC circuit 200 further includes a fifth capacitor C5 and a sixth capacitor C6. A first terminal of the fifth capacitor C5 is respectively connected to the first terminal of the eleventh switching transistor Q1, the first terminal of the thirteenth switching transistor Q3, and the first terminal of the fifteenth switching transistor Q5. A second terminal of the fifth capacitor C5 is connected to a first terminal of the sixth capacitor C6. A second terminal of the sixth capacitor C6 is respectively connected to the second terminal of the twelfth switching transistor Q2, the second terminal of the fourteenth switching transistor Q4, and the second terminal of the sixteenth switching transistor Q6. A seventh node is arranged between the second terminal of the fifth capacitor C5 and the first terminal of the sixth capacitor C6. The seventh node is connected to the first terminal of the fourth switch S4. The fifth capacitor C5 and the sixth capacitor C6 are connected in series, allowing the current to form a closed circuit with the fourth switch S4 through the seventh node when the single-phase charging is performed and the conversion from an AC signal to a DC signal is realized.

In the embodiment of the present disclosure, as shown in FIG. 2, the PFC circuit 200 further includes a first resistor R1. A first terminal of the first resistor R1 is connected to the first terminal of the fifth capacitor C5, and a second terminal of the first resistor R1 is connected to the second terminal of the sixth capacitor C6. The circuit can be protected by setting the first resistor R1.

In the embodiment of the present disclosure, as shown in FIG. 2, when the AC charging is performed, the control module 500 can control a connection status of the switch unit in the switch module 100 and the on/off of the three-phase bridge arm in the PFC circuit 200, which can realize the single-phase compatible charging function and the three-phase compatible charging function. However, in the related art, a charging power is limited to 3.3 KW when single-phase charging is performed due to the limitation of a component such as a detecting component. Therefore, the control module 500 can further control the eleventh switching transistor Q1, the twelfth switching transistor Q2, the thirteenth switching transistor Q3, the fourteenth switching transistor Q4, the fifteenth switching transistor Q5, and the sixteenth switching transistor Q6 in the three-phase bridge arm to alternatively turn on and off, so as to increase the single-phase charging power.

Figure 6:
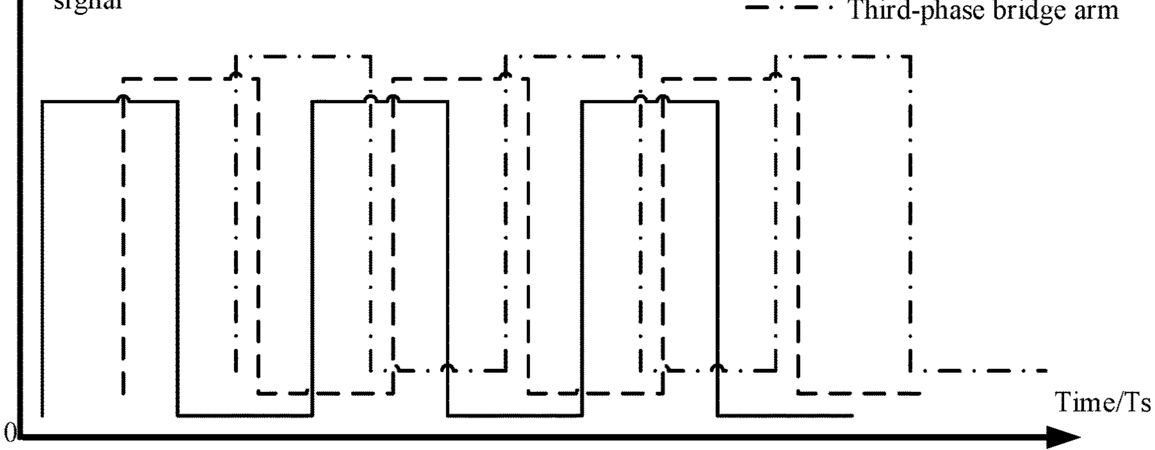
FIG. 6 is a waveform diagram of driving signals of three phases versus times according to an embodiment of the present disclosure.

FIG. 6 is a waveform diagram of driving signals of three phases versus times according to an embodiment of the present disclosure.

In the embodiment of the present disclosure, as shown in FIG. 6, For example, a driving signal of the first-phase bridge arm 201 is set as a basic drive, and the control module 500 controls the turn-on of the first-phase bridge arm 201 to realize the single-phase charging, and controls the second-phase bridge arm 202 to turn on by 120° later than the first-phase bridge arm 201, and the third-phase bridge arm 203 to turn on by 240° later than the first-phase bridge arm 201. That is to say, the third-phase bridge arm 203 is turned on by 120° later than the second-phase bridge arm 202, and the first-phase bridge arm 201 is turned on again by 120° after the third-phase bridge arm 203 is turned on. By controlling the periodic turn-on and turn-off of the three-phase bridge arm, the driving signal of the first-phase bridge arm, the driving signal of the second-phase bridge arm, and the driving signal of the third-phase bridge arm can be alternatively powered throughout the cycle. Compared with the single-phase charging in the related art, the charging efficiency can be effectively improved.

In the embodiment of the present disclosure, as shown in FIG. 2, the first DC conversion module 300 includes a seventeenth switching transistor Q7, an eighteenth switching transistor Q8, a nineteenth switching transistor Q9, and a twentieth switching transistor Q10. A first terminal of the seventeenth switching transistor Q7 is connected to a first terminal of the nineteenth switching transistor Q9 as the first input terminal of the first DC conversion module 300. A second terminal of the eighteenth switching transistor Q8 and a second terminal of the twentieth switching transistor Q10 are connected together to form the second input terminal of the first DC conversion module 300.

As shown in FIG. 2, the first terminal of the seventeenth switching transistor Q7 is respectively connected to the first terminal of the fifth capacitor C5 and the first terminal of the fifteenth switching transistor Q5. The second terminal of the seventeenth switching transistor Q7 is connected to the first terminal of the eighteenth switching transistor Q8. A control terminal of the seventeenth switching transistor is connected to the control module 500. The second terminal of the eighteenth switching transistor Q8 is respectively connected to the second terminal of the sixth capacitor C6 and the second terminal of the sixteenth switching transistor Q6. A control terminal of the eighteenth switching transistor Q8 is connected to the control module 500. An eighth node is arranged between the first terminal of the eighteenth switching transistor Q8 and the second terminal of the seventeenth switching transistor Q7.

As shown in FIG. 2, the first terminal of the nineteenth switching transistor Q9 is connected to the first terminal of the seventeenth switching transistor Q7. The second terminal of the nineteenth switching transistor Q9 is connected to the first terminal of the twentieth switching transistor Q10. A control terminal of the nineteenth switching transistor Q9 is connected to the control module 500. The second terminal of the twentieth switching transistor Q10 is connected to the second terminal of the eighteenth switching transistor Q8. A control terminal of the twentieth switching transistor Q10 is connected to the control module 500. A ninth node is arranged between the first terminal of the twentieth switching transistor Q10 and the second terminal of the nineteenth switching transistor Q9.

As shown in FIG. 2, the third transformer 3 includes a third primary coil M3 and a fifth secondary coil m5. A first terminal of the third primary coil M3 is connected to the eighth node through a seventh inductor L7, and a second terminal of the third primary coil M3 is connected to the ninth node through a seventh capacitor C7, and configured to transform the DC signal outputted by the PFC circuit 200. For example, the DC signal converted from the AC signal is processed to convert to the high-voltage DC signal required for the power battery 20 to power the power battery 20.

As shown in FIG. 2, the first DC conversion module includes a twenty-first switching transistor Q11 and a twenty-second switching transistor Q12. A first terminal of the twenty-first switching transistor Q11 is connected to a first terminal of the power battery. A second terminal of the twenty-first switching transistor Q11 is connected to a first terminal of the twenty-second switching transistor Q12. A control terminal of the twenty-first switching transistor Q11 is connected to the control module 500. A second terminal of the twenty-second switching transistor Q12 is connected to a second terminal of the power battery. A control terminal of the twenty-second switching transistor Q12 is connected to the control module 500. A tenth node is arranged between the first terminal of the twenty-second switching transistor Q12 and the second terminal of the twenty-first switching transistor Q11. The tenth node is connected to the first terminal of the fifth secondary coil m5 through an eighth inductor L8.

As shown in FIG. 2, the first DC conversion module includes a twenty-third switching transistor Q13 and a twenty-fourth switching transistor Q14. A first terminal of the twenty-third switching transistor Q13 is connected to the first terminal of the power battery. A second terminal of the twenty-third switching transistor is connected to a first terminal of the twenty-fourth switching transistor Q14. A control terminal of the twenty-third switching transistor Q13 is connected to the control module 500. A second terminal of the twenty-fourth switching transistor Q14 is connected to the second terminal of the power battery. A control terminal of the twenty-fourth switching transistor Q14 is connected to the control module 500. An eleventh node is arranged between the first terminal of the twenty-fourth switching transistor Q14 and the second terminal of the twenty-third switching transistor Q13. The eleventh node is connected to the second terminal of the fifth secondary coil m5 through an eighth capacitor C8.

As shown in FIG. 2, the first DC conversion module includes a ninth capacitor C9. A first terminal of the ninth capacitor C9 is respectively connected to the first terminal of the twenty-third switching transistor Q13 and the first terminal of the power battery. A second terminal of the ninth capacitor C9 is respectively connected to the second terminal of the twenty-fourth switching transistor Q14 and the second terminal of the power battery.

In the embodiment of the present disclosure, the charging device 10 as shown in FIG. 2 further includes a filtering module 600. An input terminal of the filtering module 600 is connected to the alternating-current input terminal. An output terminal of the filtering module 600 is connected to the second terminal of the switch module 100 for filtering the input AC signal. For example, the filtering module 600 can be set as an AC filter to filter noise and interference in the AC signal and enhance the stability of the signal.

Figure 7:
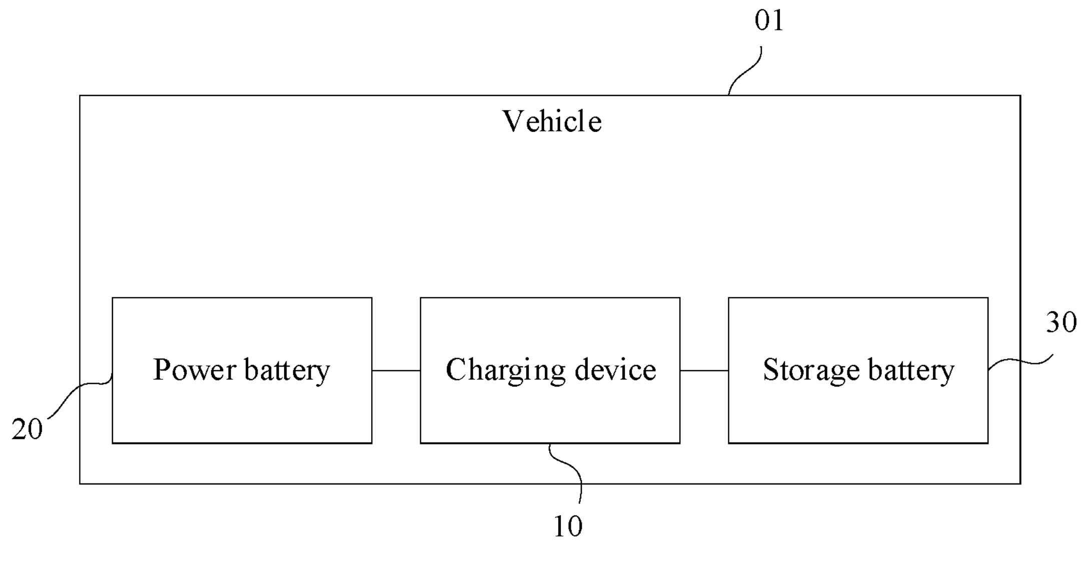
FIG. 7 is a block diagram of a vehicle according to an embodiment of the present disclosure.

FIG. 7 is a block diagram of a vehicle according to an embodiment of the present disclosure.

In the embodiment of the present disclosure, as shown in FIG. 7, the vehicle 01 includes a power battery 20, a storage battery 30, and a charging device 10. The charging device 10 is respectively connected to the power battery 20 and the storage battery 30 for charging the power battery 20 and the storage battery 30. For example, the vehicle 01 may be a charging vehicle, and the power battery 20, the storage battery 30, and the charging device 10 can be integrated and arranged into the vehicle 01, which can realize the single-phase compatible charging function and the three-phase compatible charging function. The charging modes are diverse and can be switched to the other charging mode in case of charging failure, causing the charging more flexible and convenient.

Based on the above, In the embodiment of the present disclosure, a voltage adaptation range of the power battery 20 in the vehicle 01 can be increased and can be applied to a wider range of a high-voltage operating platform and a low-voltage operating platform by adding the boost circuit 401. The first half-bridge LLC circuit 402 and the second half-bridge LLC circuit 403 are controlled to alternatively turn on and off, which can improve the efficiency of DC signal conversion, reduce the output voltage ripple, and outputs the voltage more stably. Moreover, the switch module 100 is arranged to realize the single-phase compatible charging function and the three-phase compatible charging function. The charging modes are diverse and can be switched to an other charging mode in case of charging failure, causing the charging more flexible and convenient.

The vehicle according to the embodiments of the present disclosure uses the charging device in the above embodiments. By adding a switch module for the charging device, a first terminal of the switch module is connected to an input terminal of the PFC circuit, and a second terminal of the switch module is connected to an alternating-current input terminal, to realize the single-phase charging or the three-phase charging of the charging vehicle. Therefore, the single-phase charging or the three-phase charging can be compatible. The charging modes are diverse and can be switched to the other charging mode in case of charging failure, causing the charging more flexible and convenient.

In the description of this specification, the description of the reference terms such as “an embodiment”, “some embodiments”, “exemplary embodiments”, “example”, “specific example”, or “some examples” means that the specific features, structures, materials or characteristics described with reference to the embodiment or example are included in at least one embodiment or example of the present disclosure. In the present disclosure, exemplary descriptions of the foregoing terms do not necessarily refer to the same embodiment or example.

Although the embodiments of the present disclosure have been shown and described, a person of ordinary skill in the art should understand that various changes, modifications, replacements and variations may be made to the embodiments without departing from the principles and spirit of the present disclosure, and the scope of the present disclosure is as defined by the appended claims and their equivalents.

What is claimed is:

1. A charging device for supporting both three-phase charging and single-phase charging, comprising:

a power factor correction (PFC) circuit, configured to perform PFC on an input alternating current (AC) and output a direct current (DC) signal after the PFC, wherein the PFC circuit comprises at least three-phase bridge arm;

a first DC conversion circuit, wherein an input terminal of the first DC conversion module is connected to an output terminal of the PFC circuit; and an output terminal of the first DC conversion module is connected to a power battery and configured to convert the DC signal after the PFC to a first DC signal;

a second DC conversion module, wherein an input terminal of the second DC conversion module is connected to the output terminal of the first DC conversion module and the power battery; and an output terminal of the second DC conversion module is connected to a storage battery and configured to convert the first DC signal to a second DC signal;

a switch module, wherein a first terminal of the switch module is connected to an input terminal of the PFC circuit; a second terminal of the switch module is connected to a power input terminal and, the switch module is configured to, when the power input terminal has three-phase power, turn on the three-phase bridge arm of the PFC circuit for three-phase charging and, when the power input terminal has single-phase power, turn on one of the three-phase bridge arm of the PFC circuit for single-phase charging; and a control module, respectively connected to control terminals of the PFC circuit, the first DC conversion module, the second DC conversion module, and the switch module and configured to control the charging device to perform the single-phase charging or the three-phase charging.

2. The charging device according to claim 1, wherein the second DC conversion module comprises:

a boost circuit, wherein an input terminal of the boost circuit is connected to the power battery and configured to boost the first DC signal and output the boosted DC signal;

a first half-bridge Inductor-Inductor-Capacitor (LLC) circuit, wherein an input terminal of the first half-bridge LLC circuit is connected to an output terminal of the boost circuit; and an output terminal of the first half-bridge LLC circuit is connected to the storage battery; and a second half-bridge LLC circuit, wherein an input terminal of the second half-bridge LLC circuit is connected to the output terminal of the boost circuit; an output terminal of the second half-bridge LLC circuit is connected to the storage battery;

a control terminal of the boost circuit, a control terminal of the first half-bridge LLC circuit, and a control terminal of the second half-bridge LLC circuit are all connected to the control module; and the control module is configured to alternately control the first half-bridge LLC circuit and the second half-bridge LLC circuit at a preset phase angle, to convert the boosted DC signal to the second DC signal.

3. The charging device according to claim 2, wherein the boost circuit comprises:

a first inductor, wherein a first terminal of the first inductor is connected to a first terminal of the power battery;

a first switching transistor, wherein a first terminal of the first switching transistor is respectively connected to a first input terminal of the first half-bridge LLC circuit and a first input terminal of the second half-bridge LLC circuit; and a control terminal of the first switching transistor is connected to the control module;

a second switching transistor, wherein a first terminal of the second switching transistor is connected to a second terminal of the first switching transistor; a second terminal of the second switching transistor is respectively connected to a second input terminal of the first half-bridge LLC circuit, a second input terminal of the second half-bridge LLC circuit, and a second terminal of the power battery; a control terminal of the second switching transistor is connected to the control module;

a first node is arranged between the second terminal of the first switching transistor and the first terminal of the second switching transistor; and the first node is connected to a second terminal of the first inductor; and a first capacitor, wherein a first terminal of the first capacitor is respectively connected to the first input terminal of the first half-bridge LLC circuit, the first input terminal of the second half-bridge LLC circuit, and the first terminal of the first switching transistor; and a second terminal of the first capacitor is respectively connected to the second input terminal of the first half-bridge LLC circuit, the second input terminal of the second half-bridge LLC circuit, and the second terminal of the second switching transistor.

4. The charging device according to claim 3, wherein the first half-bridge LLC circuit comprises:

a third switching transistor, wherein a first terminal of the third switching transistor is the first input terminal of the first half-bridge LLC circuit; the first terminal of the third switching transistor is respectively connected to the first terminal of the first capacitor and the first terminal of the first switching transistor; and a control terminal of the third switching transistor is connected to the control module;

a fourth switching transistor, wherein a first terminal of the fourth switching transistor is connected to a second terminal of the third switching transistor; a second terminal of the fourth switching transistor is the second input terminal of the first half-bridge LLC circuit; the second terminal of the fourth switching transistor is respectively connected to the second terminal of the first capacitor and the second terminal of the second switching transistor; a control terminal of the fourth switching transistor is connected to the control module; and a second node is arranged between the first terminal of the fourth switching transistor and the second terminal of the third switching transistor;

a first transformer, comprising a first primary coil, a first secondary coil, and a second secondary coil, wherein a first terminal of the first primary coil is connected to the second node through a second inductor and a second capacitor; a second terminal of the first primary coil is connected to the second terminal of the fourth switching transistor; a second terminal of the first secondary coil and a first terminal of the second secondary coil are connected together to form a first common terminal; and the first common terminal is connected to a second terminal of the storage battery;

a fifth switching module, wherein a first terminal of the fifth switching transistor is connected to a first terminal of the storage battery; a second terminal of the fifth switching transistor is connected to the first terminal of the first secondary coil; and a control terminal of the fifth switching transistor is connected to the control module; and a sixth switching transistor, wherein a first terminal of the sixth switching transistor is respectively connected to the first terminal of the fifth switching transistor and the first terminal of the storage battery; and a second terminal of the sixth switching transistor is connected to a second terminal of the second secondary coil.

5. The charging device according to claim 4, wherein the second half-bridge LLC circuit comprises:

a seventh switching transistor, wherein a first terminal of the seventh switching transistor is the first input terminal of the second half-bridge LLC circuit; the first terminal of the seventh switching transistor is respectively connected to the first terminal of the first capacitor and the first terminal of the first switching transistor; and a control terminal of the seventh switching transistor is connected to the control module;

an eighth switching transistor, wherein a first terminal of the eighth switching transistor is connected to a second terminal of the seventh switching transistor; a second terminal of the eighth switching transistor is the second input terminal of the second half-bridge LLC circuit; the second terminal of the eighth switching transistor is respectively connected to the second terminal of the first capacitor and the second terminal of the second switching transistor; a control terminal of the eighth switching transistor is connected to the control module; and a third node is arranged between the first terminal of the eighth switching transistor and the second terminal of the seventh switching transistor;

a second transformer, comprising a second primary coil, a third secondary coil, and a fourth secondary coil, wherein a first terminal of the second primary coil is connected to the third node through a third inductor and a third capacitor; a second terminal of the second primary coil is connected to the second terminal of the eighth switching transistor; a second terminal of the third secondary coil and a first terminal of the fourth secondary coil are connected together to form a second common terminal; and the second common terminal is connected to the second terminal of the storage battery;

a ninth switching transistor, wherein a first terminal of the ninth switching transistor is connected to the first terminal of the storage battery; a second terminal of the ninth switching transistor is connected to a first terminal of the third secondary coil; and a control terminal of the ninth switching transistor is connected to the control module; and a tenth switching transistor, wherein a first terminal of the tenth switching transistor is connected to the first terminal of the ninth switching transistor and the first terminal of the storage battery; a second terminal of the tenth switching transistor is connected to a second terminal of the fourth secondary coil; and a control terminal of the tenth switching transistor is connected to the control module.

6. The charging device according to claim 1, wherein the switch module comprises:

a first switch unit, comprising a first static contact, a first idle contact, and a first switch, wherein the first static contact is connected to a first-phase alternating-current input terminal; the first idle contact is unoccupied; a first terminal of the first switch is connected to a first-phase bridge arm bridge arm of the three-phase bridge arm; a second terminal of the first switch is connected to the first static contact or the first idle contact; and the first switch unit is configured to control a connected state of the first-phase bridge arm;

a second switch unit, comprising a second static contact, a third static contact, and a second switch, wherein the second static contact is connected to a second-phase alternating-current input terminal; the third static contact is connected to the first static contact; a first terminal of the second switch is connected to a second-phase bridge arm of the three-phase bridge arm; a second terminal of the second switch is optionally connected to the second static contact or the third static contact; and the second switch unit is configured to control a connected state of the second-phase bridge arm;

a third switch unit, comprising a fourth static contact, a fifth static contact, and a third switch, wherein the fourth static contact is connected to a third-phase alternating-current input terminal; the fifth static contact is connected to the first static contact; a first terminal of the third switch is connected to a third-phase bridge arm of the three-phase bridge arm; a second terminal of the third switch is optionally connected to the fourth static contact or the fifth static contact; and the third switch unit is configured to control a connected state of the third-phase bridge arm; and a fourth switch unit, comprising a sixth static contact, a second idle contact, and a fourth switch, wherein the sixth static contact is connected to an input terminal of a center line; the second idle contact is unoccupied; a first terminal of the fourth switch is connected to a connecting terminal of a charging circuit of the PFC circuit; a second terminal of the fourth switch is optionally connected to the sixth static contact or the second idle contact; and the fourth switch unit is configured to control a turn-on state of a single-phase charging circuit.

7. The charging device according to claim 6, wherein the first-phase bridge arm comprises an eleventh switching transistor and a twelfth switching transistor; a first terminal of the eleventh switching transistor is connected to a first input terminal of the first DC conversion module; a second terminal of the eleventh switching transistor is connected to a first terminal of the twelfth switching transistor; a control terminal of the eleventh switching transistor is connected to the control module; a second terminal of the twelfth switching transistor is connected to a second input terminal of the first DC conversion module; a fourth node is arranged between the second terminal of the eleventh switching transistor and the first terminal of the twelfth switching transistor; the fourth node is connected to the first terminal of the first switch through a fourth inductor;

the second-phase bridge arm comprises a thirteenth switching transistor and a fourteenth switching transistor; a first terminal of the thirteenth switching transistor is connected to the first input terminal of the first DC conversion module; a second terminal of the thirteenth switching transistor is connected to a first terminal of the fourteenth switching transistor; a control terminal of the thirteenth switching transistor is connected to the control module; a second terminal of the fourteenth switching transistor is connected to the second input terminal of the first DC conversion module; a control terminal of the fourteenth switching transistor is connected to the control module; a fifth node is arranged between the first terminal of the fourteenth switching transistor and the second terminal of the thirteenth switching transistor; the fifth node is connected to the first terminal of the second switch through a fifth inductor;

the third-phase bridge arm comprises a fifteenth switching transistor and a sixteenth switching transistor; a first terminal of the fifteenth switching transistor is connected to the first input terminal of the first DC conversion module; a second terminal of the fifteenth switching transistor is connected to a first terminal of the sixteenth switching transistor; a control terminal of the fifteenth switching transistor is connected to the control module; a second terminal of the sixteenth switching transistor is connected to the second input terminal of the first DC conversion module; a control terminal of the sixteenth switching transistor is connected to the control module; a sixth node is arranged between the first terminal of the sixteenth switching transistor and the second terminal of the fifteenth switching transistor; the sixth node is connected to the first terminal of the third switch through a sixth inductor;

the PFC circuit further comprises a fifth capacitor and a sixth capacitor; a first terminal of the fifth capacitor is respectively connected to the first terminal of the eleventh switching transistor, the first terminal of the thirteenth switching transistor, and the first terminal of the fifteenth switching transistor; a second terminal of the fifth capacitor is connected to a first terminal of the sixth capacitor; a second terminal of the sixth capacitor is respectively connected to the second terminal of the twelfth switching transistor, the second terminal of the fourteenth switching transistor, and the second terminal of the sixteenth switching transistor; a seventh node is arranged between the second terminal of the fifth capacitor and the first terminal of the sixth capacitor; the seventh node is connected to the first terminal of the fourth switch;

the PFC circuit further comprises a first resistor; a first terminal of the first resistor is connected to the first terminal of the fifth capacitor; and a second terminal of the first resistor is connected to the second terminal of the sixth capacitor.

8. The charging device according to claim 7, wherein the first DC conversion module comprises:

a seventeenth switching transistor, an eighteenth switching transistor, a nineteenth switching transistor, and a twentieth switching transistor; a first terminal of the seventeenth switching transistor and a first terminal of the nineteenth switching transistor are connected together to form the first input terminal of the first DC conversion module; a second terminal of the eighteenth switching transistor and a second terminal of the twentieth switching transistor are connected together to form the second input terminal of the first DC conversion module;

the first terminal of the seventeenth switching transistor is respectively connected to the first terminal of the fifth capacitor and the first terminal of the fifteenth switching transistor; the second terminal of the seventeenth switching transistor is connected to the first terminal of the eighteenth switching transistor; a control terminal of the seventeenth switching transistor is connected to the control module; the second terminal of the eighteenth switching transistor is respectively connected to the second terminal of the sixth capacitor and the second terminal of the sixteenth switching transistor; a control terminal of the eighteenth switching transistor is connected to the control module; an eighth node is arranged between the first terminal of the eighteenth switching transistor and the second terminal of the seventeenth switching transistor;

the first terminal of the nineteenth switching transistor is connected to the first terminal of the seventeenth switching transistor; the second terminal of the nineteenth switching transistor is connected to a first terminal of the twentieth switching transistor; a control terminal of the nineteenth switching transistor is connected to the control module; the second terminal of the twentieth switching transistor is connected to the second terminal of the eighteenth switching transistor; a control terminal of the twentieth switching transistor is connected to the control module; and a ninth node is arranged between the first terminal of the twentieth switching transistor and the second terminal of the nineteenth switching transistor;

a third transformer, comprising a third primary coil and a fifth secondary coil, wherein a first terminal of the third primary coil is connected to the eighth node through a seventh inductor; and a second terminal of the third primary coil is connected to the ninth node through a seventh capacitor;

a twenty-first switching transistor and a twenty-second switching transistor, wherein a first terminal of the twenty-first switching transistor is connected to a first terminal of the power battery; a second terminal of the twenty-first switching transistor is connected to a first terminal of the twenty-second switching transistor; a control terminal of the twenty-first switching transistor is connected to the control module; a second terminal of the twenty-second switching transistor is connected to a second terminal of the power battery; a control terminal of the twenty-second switching transistor is connected to the control module; a tenth node is arranged between the first terminal of the twenty-second switching transistor and the second terminal of the twenty-first switching transistor; and the tenth node is connected to a first terminal of the fifth secondary coil through an eighth inductor;

a twenty-third switching transistor and a twenty-fourth switching transistor, wherein a first terminal of the twenty-third switching transistor is connected to the first terminal of the power battery; a second terminal of the twenty-third switching transistor is connected to a first terminal of the twenty-fourth switching transistor; a control terminal of the twenty-third switching transistor is connected to the control module; a second terminal of the twenty-fourth switching transistor is connected to the second terminal of the power battery; a control terminal of the twenty-fourth switching transistor is connected to the control module; an eleventh node is arranged between the first terminal of the twenty-fourth switching transistor and the second terminal of the twenty-third switching transistor; and the eleventh node is connected to a second terminal of the fifth secondary coil through an eighth capacitor; and a ninth capacitor, wherein a first terminal of the ninth capacitor is respectively connected to the first terminal of the twenty-third switching transistor and the first terminal of the power battery; and a second terminal of the ninth capacitor is respectively connected to the second terminal of the twenty-fourth switching transistor and the second terminal of the power battery.

9. The charging device according to claim 1, wherein the charging device further comprises:

a filtering module, wherein an input terminal of the filtering module is connected to the alternating-current input terminal; and an output terminal of the filtering module is connected to the second terminal of the switch module to filter the input AC signal.

10. A vehicle, comprising:

a charging device for supporting both three-phase charging and single-phase charging; and a power battery and a storage battery, wherein the charging device is respectively connected to the power battery and the storage battery to charge the power battery and the storage battery, wherein the charging device comprises:

a power factor correction (PFC) circuit, configured to perform PFC on an input alternating current (AC) and output a direct current (DC) signal after the PFC, wherein the PFC circuit comprises at least three-phase bridge arm;

a first DC conversion module, wherein an input terminal of the first DC conversion module is connected to an output terminal of the PFC circuit; and an output terminal of the first DC conversion module is connected to the power battery and configured to convert the DC signal after the PFC to a first DC signal;

a second DC conversion module, wherein an input terminal of the second DC conversion module is connected to the output terminal of the first DC conversion module and the power battery; and an output terminal of the second DC conversion module is connected to the storage battery and configured to convert the first DC signal to a second DC signal;

a switch module, wherein a first terminal of the switch module is connected to an input terminal of the PFC circuit; a second terminal of the switch module is connected to a power input terminal and, the switch module is configured to, when the power input terminal has three-phase power, turn on the three-phase bridge arm of the PFC circuit for three-phase charging and, when the power input terminal has single-phase power, turn on one of the three-phase bridge arm of the PFC circuit for single-phase charging; and a control module, respectively connected to control terminals of the PFC circuit, the first DC conversion module, the second DC conversion module, and the switch module and configured to control the charging device to perform the single-phase charging or the three-phase charging.

11. The vehicle according to claim 10, wherein the second DC conversion module comprises:

a boost circuit, wherein an input terminal of the boost circuit is connected to the power battery and configured to boost the first DC signal and output the boosted DC signal;

a first half-bridge Inductor-Inductor-Capacitor (LLC) circuit, wherein an input terminal of the first half-bridge LLC circuit is connected to an output terminal of the boost circuit; and an output terminal of the first half-bridge LLC circuit is connected to the storage battery; and a second half-bridge LLC circuit, wherein an input terminal of the second half-bridge LLC circuit is connected to the output terminal of the boost circuit; an output terminal of the second half-bridge LLC circuit is connected to the storage battery;

a control terminal of the boost circuit, a control terminal of the first half-bridge LLC circuit, and a control terminal of the second half-bridge LLC circuit are all connected to the control module; and the control module is configured to alternately control the first half-bridge LLC circuit and the second half-bridge LLC circuit at a preset phase angle, to convert the boosted DC signal to the second DC signal.

12. The vehicle according to claim 11, wherein the boost circuit comprises:

a first inductor, wherein a first terminal of the first inductor is connected to a first terminal of the power battery;

a first switching transistor, wherein a first terminal of the first switching transistor is respectively connected to a first input terminal of the first half-bridge LLC circuit and a first input terminal of the second half-bridge LLC circuit; and a control terminal of the first switching transistor is connected to the control module;

a second switching transistor, wherein a first terminal of the second switching transistor is connected to a second terminal of the first switching transistor; a second terminal of the second switching transistor is respectively connected to a second input terminal of the first half-bridge LLC circuit, a second input terminal of the second half-bridge LLC circuit, and a second terminal of the power battery; a control terminal of the second switching transistor is connected to the control module;

a first node is arranged between the second terminal of the first switching transistor and the first terminal of the second switching transistor; and the first node is connected to a second terminal of the first inductor; and a first capacitor, wherein a first terminal of the first capacitor is respectively connected to the first input terminal of the first half-bridge LLC circuit, the first input terminal of the second half-bridge LLC circuit, and the first terminal of the first switching transistor; and a second terminal of the first capacitor is respectively connected to the second input terminal of the first half-bridge LLC circuit, the second input terminal of the second half-bridge LLC circuit, and the second terminal of the second switching transistor.

13. The vehicle according to claim 12, wherein the first half-bridge LLC circuit comprises:

a third switching transistor, wherein a first terminal of the third switching transistor is the first input terminal of the first half-bridge LLC circuit; the first terminal of the third switching transistor is respectively connected to the first terminal of the first capacitor and the first terminal of the first switching transistor; and a control terminal of the third switching transistor is connected to the control module;

a fourth switching transistor, wherein a first terminal of the fourth switching transistor is connected to a second terminal of the third switching transistor; a second terminal of the fourth switching transistor is the second input terminal of the first half-bridge LLC circuit; the second terminal of the fourth switching transistor is respectively connected to the second terminal of the first capacitor and the second terminal of the second switching transistor; a control terminal of the fourth switching transistor is connected to the control module; and a second node is arranged between the first terminal of the fourth switching transistor and the second terminal of the third switching transistor;

a first transformer, comprising a first primary coil, a first secondary coil, and a second secondary coil, wherein a first terminal of the first primary coil is connected to the second node through a second inductor and a second capacitor; a second terminal of the first primary coil is connected to the second terminal of the fourth switching transistor; a second terminal of the first secondary coil and a first terminal of the second secondary coil are connected together to form a first common terminal; and the first common terminal is connected to a second terminal of the storage battery;

a fifth switching module, wherein a first terminal of the fifth switching transistor is connected to a first terminal of the storage battery; a second terminal of the fifth switching transistor is connected to the first terminal of the first secondary coil; and a control terminal of the fifth switching transistor is connected to the control module; and a sixth switching transistor, wherein a first terminal of the sixth switching transistor is respectively connected to the first terminal of the fifth switching transistor and the first terminal of the storage battery; and a second terminal of the sixth switching transistor is connected to a second terminal of the second secondary coil.

14. The vehicle according to claim 13, wherein the second half-bridge LLC circuit comprises:

a seventh switching transistor, wherein a first terminal of the seventh switching transistor is the first input terminal of the second half-bridge LLC circuit; the first terminal of the seventh switching transistor is respectively connected to the first terminal of the first capacitor and the first terminal of the first switching transistor; and a control terminal of the seventh switching transistor is connected to the control module;

an eighth switching transistor, wherein a first terminal of the eighth switching transistor is connected to a second terminal of the seventh switching transistor; a second terminal of the eighth switching transistor is the second input terminal of the second half-bridge LLC circuit; the second terminal of the eighth switching transistor is respectively connected to the second terminal of the first capacitor and the second terminal of the second switching transistor; a control terminal of the eighth switching transistor is connected to the control module; and a third node is arranged between the first terminal of the eighth switching transistor and the second terminal of the seventh switching transistor;

a second transformer, comprising a second primary coil, a third secondary coil, and a fourth secondary coil, wherein a first terminal of the second primary coil is connected to the third node through a third inductor and a third capacitor; a second terminal of the second primary coil is connected to the second terminal of the eighth switching transistor; a second terminal of the third secondary coil and a first terminal of the fourth secondary coil are connected together to form a second common terminal; and the second common terminal is connected to the second terminal of the storage battery;

a ninth switching transistor, wherein a first terminal of the ninth switching transistor is connected to the first terminal of the storage battery; a second terminal of the ninth switching transistor is connected to a first terminal of the third secondary coil; and a control terminal of the ninth switching transistor is connected to the control module; and a tenth switching transistor, wherein a first terminal of the tenth switching transistor is respectively connected to the first terminal of the ninth switching transistor and the first terminal of the storage battery; a second terminal of the tenth switching transistor is connected to a second terminal of the fourth secondary coil; and a control terminal of the tenth switching transistor is connected to the control module.

15. The vehicle according to claim 10, wherein the switch module comprises:

a first switch unit, comprising a first static contact, a first idle contact, and a first switch, wherein the first static contact is connected to a first-phase alternating-current input terminal; the first idle contact is unoccupied; a first terminal of the first switch is connected to a first-phase bridge arm bridge arm of the three-phase bridge arm; a second terminal of the first switch is optionally connected to the first static contact or the first idle contact; and the first switch unit is configured to control a connected state of the first-phase bridge arm;

a second switch unit, comprising a second static contact, a third static contact, and a second switch, wherein the second static contact is connected to a second-phase alternating-current input terminal; the third static contact is connected to the first static contact; a first terminal of the second switch is connected to a second-phase bridge arm of the three-phase bridge arm; a second terminal of the second switch is optionally connected to the second static contact or the third static contact; and the second switch unit is configured to control a connected state of the second-phase bridge arm;

a third switch unit, comprising a fourth static contact, a fifth static contact, and a third switch, wherein the fourth static contact is connected to a third-phase alternating-current input terminal; the fifth static contact is connected to the first static contact; a first terminal of the third switch is connected to a third-phase bridge arm of the three-phase bridge arm; a second terminal of the third switch is optionally connected to the fourth static contact or the fifth static contact; and the third switch unit is configured to control a connected state of the third-phase bridge arm; and a fourth switch unit, comprising a sixth static contact, a second idle contact, and a fourth switch, wherein the sixth static contact is connected to an input terminal of a center line; the second idle contact is unoccupied; a first terminal of the fourth switch is connected to a connecting terminal of a charging circuit of the PFC circuit; a second terminal of the fourth switch is optionally connected to the sixth static contact or the second idle contact; and the fourth switch unit is configured to control a turn-on state of a single-phase charging circuit.

16. The vehicle according to claim 15, wherein the first-phase bridge arm comprises an eleventh switching transistor and a twelfth switching transistor; a first terminal of the eleventh switching transistor is connected to a first input terminal of the first DC conversion module; a second terminal of the eleventh switching transistor is connected to a first terminal of the twelfth switching transistor; a control terminal of the eleventh switching transistor is connected to the control module; a second terminal of the twelfth switching transistor is connected to a second input terminal of the first DC conversion module; a fourth node is arranged between the second terminal of the eleventh switching transistor and the first terminal of the twelfth switching transistor; the fourth node is connected to the first terminal of the first switch through a fourth inductor;

the second-phase bridge arm comprises a thirteenth switching transistor and a fourteenth switching transistor; a first terminal of the thirteenth switching transistor is connected to the first input terminal of the first DC conversion module; a second terminal of the thirteenth switching transistor is connected to a first terminal of the fourteenth switching transistor; a control terminal of the thirteenth switching transistor is connected to the control module; a second terminal of the fourteenth switching transistor is connected to the second input terminal of the first DC conversion module; a control terminal of the fourteenth switching transistor is connected to the control module; a fifth node is arranged between the first terminal of the fourteenth switching transistor and the second terminal of the thirteenth switching transistor; the fifth node is connected to the first terminal of the second switch through a fifth inductor;

the third-phase bridge arm comprises a fifteenth switching transistor and a sixteenth switching transistor; a first terminal of the fifteenth switching transistor is connected to the first input terminal of the first DC conversion module; a second terminal of the fifteenth switching transistor is connected to a first terminal of the sixteenth switching transistor; a control terminal of the fifteenth switching transistor is connected to the control module; a second terminal of the sixteenth switching transistor is connected to the second input terminal of the first DC conversion module; a control terminal of the sixteenth switching transistor is connected to the control module; a sixth node is arranged between the first terminal of the sixteenth switching transistor and the second terminal of the fifteenth switching transistor; the sixth node is connected to the first terminal of the third switch through a sixth inductor;

the PFC circuit further comprises a fifth capacitor and a sixth capacitor; a first terminal of the fifth capacitor is respectively connected to the first terminal of the eleventh switching transistor, the first terminal of the thirteenth switching transistor, and the first terminal of the fifteenth switching transistor; a second terminal of the fifth capacitor is connected to a first terminal of the sixth capacitor; a second terminal of the sixth capacitor is respectively connected to the second terminal of the twelfth switching transistor, the second terminal of the fourteenth switching transistor, and the second terminal of the sixteenth switching transistor; a seventh node is arranged between the second terminal of the fifth capacitor and the first terminal of the sixth capacitor; the seventh node is connected to the first terminal of the fourth switch;

the PFC circuit further comprises a first resistor; a first terminal of the first resistor is connected to the first terminal of the fifth capacitor; and a second terminal of the first resistor is connected to the second terminal of the sixth capacitor.

17. The vehicle according to claim 16, wherein the first DC conversion module comprises:

a seventeenth switching transistor, an eighteenth switching transistor, a nineteenth switching transistor, and a twentieth switching transistor; a first terminal of the seventeenth switching transistor and a first terminal of the nineteenth switching transistor are connected together to form the first input terminal of the first DC conversion module; a second terminal of the eighteenth switching transistor and a second terminal of the twentieth switching transistor are connected together to form the second input terminal of the first DC conversion module;

the first terminal of the seventeenth switching transistor is respectively connected to the first terminal of the fifth capacitor and the first terminal of the fifteenth switching transistor; the second terminal of the seventeenth switching transistor is connected to the first terminal of the eighteenth switching transistor; a control terminal of the seventeenth switching transistor is connected to the control module; the second terminal of the eighteenth switching transistor is respectively connected to the second terminal of the sixth capacitor and the second terminal of the sixteenth switching transistor; a control terminal of the eighteenth switching transistor is connected to the control module; an eighth node is arranged between the first terminal of the eighteenth switching transistor and the second terminal of the seventeenth switching transistor;

the first terminal of the nineteenth switching transistor is connected to the first terminal of the seventeenth switching transistor; the second terminal of the nineteenth switching transistor is connected to a first terminal of the twentieth switching transistor; a control terminal of the nineteenth switching transistor is connected to the control module; the second terminal of the twentieth switching transistor is connected to the second terminal of the eighteenth switching transistor; a control terminal of the twentieth switching transistor is connected to the control module; and a ninth node is arranged between the first terminal of the twentieth switching transistor and the second terminal of the nineteenth switching transistor;

a third transformer, comprising a third primary coil and a fifth secondary coil, wherein a first terminal of the third primary coil is connected to the eighth node through a seventh inductor; and a second terminal of the third primary coil is connected to the ninth node through a seventh capacitor;

a twenty-first switching transistor and a twenty-second switching transistor, wherein a first terminal of the twenty-first switching transistor is connected to a first terminal of the power battery; a second terminal of the twenty-first switching transistor is connected to a first terminal of the twenty-second switching transistor; a control terminal of the twenty-first switching transistor is connected to the control module; a second terminal of the twenty-second switching transistor is connected to a second terminal of the power battery; a control terminal of the twenty-second switching transistor is connected to the control module; a tenth node is arranged between the first terminal of the twenty-second switching transistor and the second terminal of the twenty-first switching transistor; and the tenth node is connected to a first terminal of the fifth secondary coil through an eighth inductor;

a twenty-third switching transistor and a twenty-fourth switching transistor, wherein a first terminal of the twenty-third switching transistor is connected to the first terminal of the power battery; a second terminal of the twenty-third switching transistor is connected to a first terminal of the twenty-fourth switching transistor; a control terminal of the twenty-third switching transistor is connected to the control module; a second terminal of the twenty-fourth switching transistor is connected to the second terminal of the power battery; a control terminal of the twenty-fourth switching transistor is connected to the control module; an eleventh node is arranged between the first terminal of the twenty-fourth switching transistor and the second terminal of the twenty-third switching transistor; and the eleventh node is connected to a second terminal of the fifth secondary coil through an eighth capacitor; and a ninth capacitor, wherein a first terminal of the ninth capacitor is respectively connected to the first terminal of the twenty-third switching transistor and the first terminal of the power battery; and a second terminal of the ninth capacitor is respectively connected to the second terminal of the twenty-fourth switching transistor and the second terminal of the power battery.

18. The vehicle according to claim 10, wherein the charging device further comprises:

a filtering module, wherein an input terminal of the filtering module is connected to the alternating-current input terminal; and an output terminal of the filtering module is connected to the second terminal of the switch module to filter the input AC signal.

* * * * *